United States Patent [19]

Markey

[11] Patent Number: 4,880,983

[45] Date of Patent: Nov. 14, 1989

[54] HIGH PRESSURE XENON IONIZATION DETECTOR

[75] Inventor: John K. Markey, New Haven, Conn.

[73] Assignee: Yale University, New Haven, Conn.

[21] Appl. No.: 175,887

[22] Filed: Mar. 31, 1988

[51] Int. Cl.[4] .......................... G01T 1/185; H01J 47/02

[52] U.S. Cl. .................................. 250/385.1; 250/374; 250/379

[58] Field of Search ....................... 250/374, 379, 385.1

[56] References Cited

U.S. PATENT DOCUMENTS

| | | | |
|---|---|---|---|
| 4,317,038 | 2/1982 | Charpak | 250/385.1 |
| 4,719,354 | 1/1988 | Whetten | 250/385.1 |

OTHER PUBLICATIONS

Norman Davidson and A. E. Larsh, Jr., "Conductivity Pulses in Liquid Argon", *Physical Review*, 74, p. 220 (1948).

Norman Davidson and A. E. Larsh, Jr., "Conductivity Pulses in Insulating Liquids by Ionizing Radiation", *Physical Review*, 77, 5, pp. 706–711, (Mar. 1, 1950).

L. S. Miller, S. Howe and W. E. Spear, "Charge Transport in Solid and Liquid Ar, Kr, and Xe", *Physical Review*, 166, 3, pp. 871–878, (Feb. 13, 1967).

Peter J. Doe, Hans-Jurg Mahler, Herbert H. Chen, "Observation of Tracks in a Two-Dimensional Liquid Argon Time Projection Chamber", *Nuclear Instruments and Methods*, 199, pp. 639–642, (1982).

T. Takahashi, S. Konno, T. Hamada, M. Miyajima, S. Kubota, A. Nakamoto, A. Hitachi, E. Shibamura and T. Doke, "Average Energy Expanded Per Ion Pair in Liquid Xenon", *Physical Review*, 12, 5, pp. 1771–1775, (Nov. 1975).

E. Shibamura, A. Hitachi, T. Doke, T. Takahashi, S. Kubota and M. Miyajima, "Drift Velocities of Electrons, Saturation Characteristics of Ionization and W-–Values for Conversion Electrons in Liquid Argon, Liquid Argon-Gas Mixtures and Liquid Xenon", *Nuclear Instruments and Methods*, 131, pp. 249–258, (1975).

O. Bunemann, T. E. Cranshaw and J. A. Harvey, "Design of Grid Ionization Chambers", *Canadian Journal of Research*, 27, 191–206, (1949).

A. S. Barabash, A. A. Golubev, O. V. Kazachenko, "Liquid Argon Compton γ Spectrometer", *Instruments and Experimental Techniques*, vol. 23, No. 1, (Jul. 1980), pp. 55–57, ©1980, Plenum Publishing Corporation (USA). [Translated from Pribory i Tekhnika Eksperimenta, No. 1 (Jan.-Feb. 1980) pp. 60–61].

*Primary Examiner*—Constantine Hannaher
*Attorney, Agent, or Firm*—Sprung Horn Kramer & Woods

[57] ABSTRACT

A method is provided for detecting ionization comprising allowing particles that cause ionization to contact high pressure xenon maintained at or near its critical point and measuring the amount of ionization.

An apparatus is provided for detecting ionization, the apparatus comprising a vessel containing a ionizable medium, the vessel having an inlet to allow high pressure ionizable medium to enter the vessel, a means to permit particles that cause ionization of the medium to enter the vessel, an anode, a cathode, a grid and a plurality of annular field shaping rings, the field shaping rings being electrically isolated from one another, the anode, cathode, grid and field shaping rings being electrically isolated from one another in order to form an electric field between the cathode and the anode, the electric field originating at the anode and terminating at the cathode, the grid being disposed between the cathode and the anode, the field shaping rings being disposed between the cathode and the grid, the improvement comprising the medium being xenon and the vessel being maintained at a pressure of 50 to 70 atmospheres and a temperature of 0° to 30° C.

10 Claims, 2 Drawing Sheets

HIGH PRESSURE XENON IONIZATION DETECTOR

GOVERNMENT RIGHTS

This invention was made with United States Government support under contract DE-AC02-ERO 3074 from the Department of Energy (DOE). The United States Government has certain rights in this invention.

BACKGROUND OF THE INVENTION

1. Field of the Invention

The present invention concerns a high pressure xenon ionization detector. More particularly, the present invention relates to the use of xenon at or near its critical point for detecting ionization.

2. Background Information

Heretofore the following detector systems were used to detect ionization for nuclear radiation: sodium iodide crystals, germanium crystals and cryogenic liquid noble gases.

Sodium iodide crystals were heretofore used to detect nuclear radiation, for example, gamma-rays. The efficiency of such detection system, however, was quite small, only a few percentage points, and the energy resolution was quite poor, i.e., $10^5$ electron volts for detection of $10^6$ electron volt gamma-rays. Large (quantitative) energy resolution results in poor discrimination of energy levels.

The use of intrinsic germanium crystal detectors proved to provide an acceptable energy resolution (approximately 1,600 electron volts), but the efficiency of germanium detection systems was very low, i.e. $10^{-3}$.

Cryogenic liquid noble gas ionization detectors have been built since the work of Norman Davidson and A. E. Larsh, Jr., *Physical Review,* 74, pp. 220, (1948) and Norman Davidson and A. E. Larsh, Jr., "Conductivity Pulses in Insulating Liquids by Ionizing Radiation", *Physical Review,* 77, 706–711, (1950). They used cryogenic liquid argon operating near the thermodynamic triple point. Later, L. S. Miller, S. Howe and W. E. Spear, "Charge Transport in Solid and Liquid Ar, Kr, and Xe", *Physical Review,* 166, 871–878, (1967), used cryogenic liquid xenon near its triple point to measure the ionization due to energetic electrons.

Triple Point of Ar : 83.8° K., 517.15 mm Hg
Critical Point of Ar : 150.7° K., 48.6 bar
Triple Point of Xe : 161.4° K., 612.2 mm Hg
Critical Point of Xe : 289.72° K., 58.4 bar.

Several groups of physicists have built cryogenic liquid xenon or argon ionization detectors. All of these, however, have been designed to operate at or near the thermodynamic triple point of each liquid.

The technique of measurement of the ionization in a cryogenic liquid noble gas detector was developed by a group at University California at Irvine, Peter J. Doe, Hans-Jurg Mahler, Herbert H. Chen, "Observation of Tracks in a Two-Dimensional Liquid Argon Time Projection Chamber", *Nuclear Instruments and Methods,* 199, 639–642, (1982).

Cryogenic liquid xenon ionization detectors operating near the triple point (not the critical point) of xenon have been developed and studied by T. Takahashi, S. Konno, T, Hamada, M. Miyajima, S. Kubota, A. Nakamoto, A. Hitachi, E. Shibamura and T. Doke, "Average Energy Expanded Per Ion Pair in Liquid Xenon", *Physical Review,* 12, 1771–1775, (1975) and E. Shibamura, A. Hitachi, T. Doke, T. Takahashi, S. Kubota and M. Miyajima, "Drift Velocities of Electrons, Saturation Characteristics of Ionization and W-Values for Conversion Electrons in Liquid Argon, Liquid Argon-Gas Mixtures and Liquid Xenon", *Nuclear Instruments and Methods,* 131, 249–258, (1975).

The design characteristics of ionization detectors containing grids is described in O. Bunemann, T. E. Cranshaw and J. A. Harvey, "Design of Grid Ionization Chambers", *Canadian Journal of Research,* 27, 191–206, (1949).

Previous workers in the art have employed liquid xenon detector systems, but at low pressures, approximately one atmosphere, and at very low temperatures, near the triple point. The use of xenon at such low temperatures required extensive and expensive cooling system, vacuum cryostats and the need for precise temperature control. Also the energy resolution of such prior xenon systems is poor, i.e., 65,000 electron volts for detection of 1,000,000 electron volt gamma-rays.

SUMMARY OF THE INVENTION

The present invention concerns a method for detecting ionization comprising allowing particles that cause ionization to contact high pressure xenon maintained at or near its critical point and measuring the amount of ionization of the xenon.

The present invention also relates to an apparatus for detecting ionization, the apparatus comprising a vessel containing an ionizable medium, the vessel having an inlet to allow high pressure ionizable medium to enter the vessel, a means to permit particles that cause ionization of the medium to enter the vessel, an anode, a cathode, a grid and a plurality of annular field shaping rings, the field shaping rings being electrically isolated from one another, the anode, cathode, grid and field shaping rings being electrically isolated from one another in order to form an electric field between the cathode and the anode, the electric field originating at the anode and terminating at the cathode, the grid being disposed between the cathode and the anode, the field shaping rings being disposed between the cathode and the grid, the improvement comprising the medium being xenon and the vessel being maintained at a pressure of 50 to 70 atmospheres (50.66 to 70.92 bar), preferably 55 to 65 atmospheres (55.72 to 65.86 bar) and at a temperature of 0° to 30° C., preferably 16° to 22° C.

DETAILED DESCRIPTION OF THE INVENTION

Figure 1:
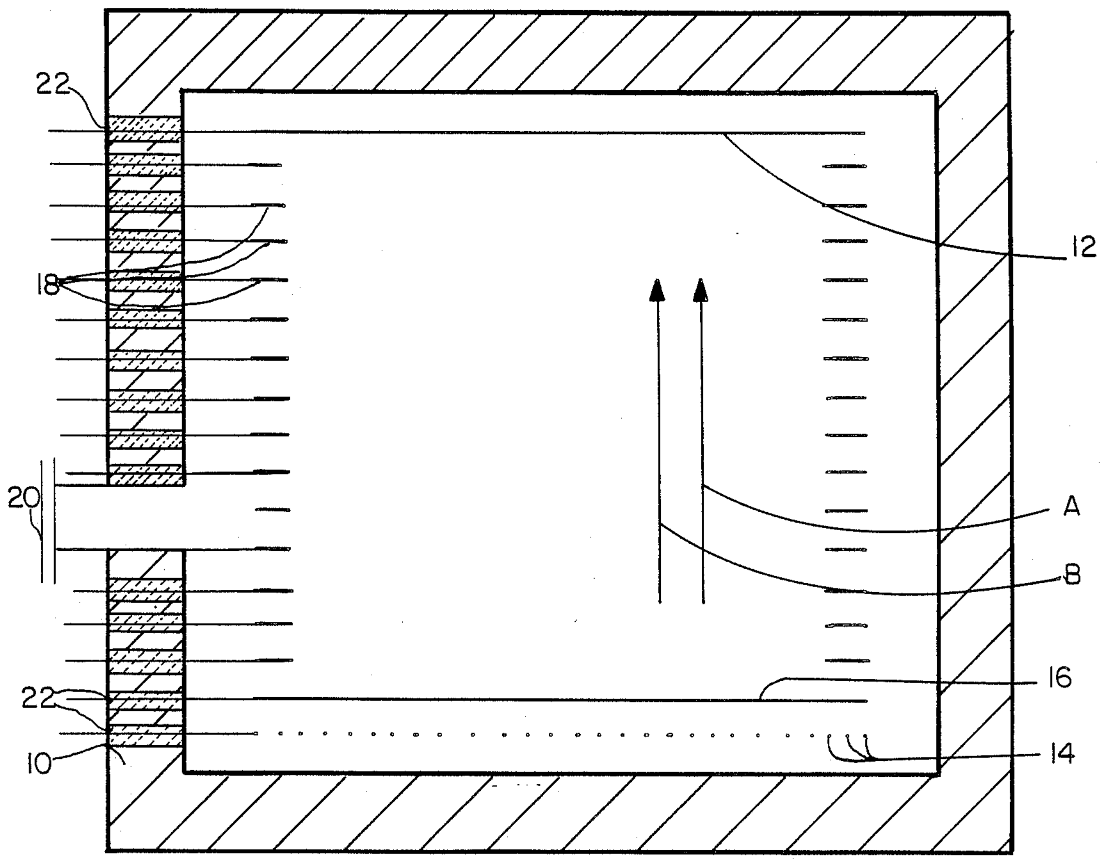
FIG. 1 schematically depicts in cross-section a high pressure xenon ionization detector.
Figure 2:
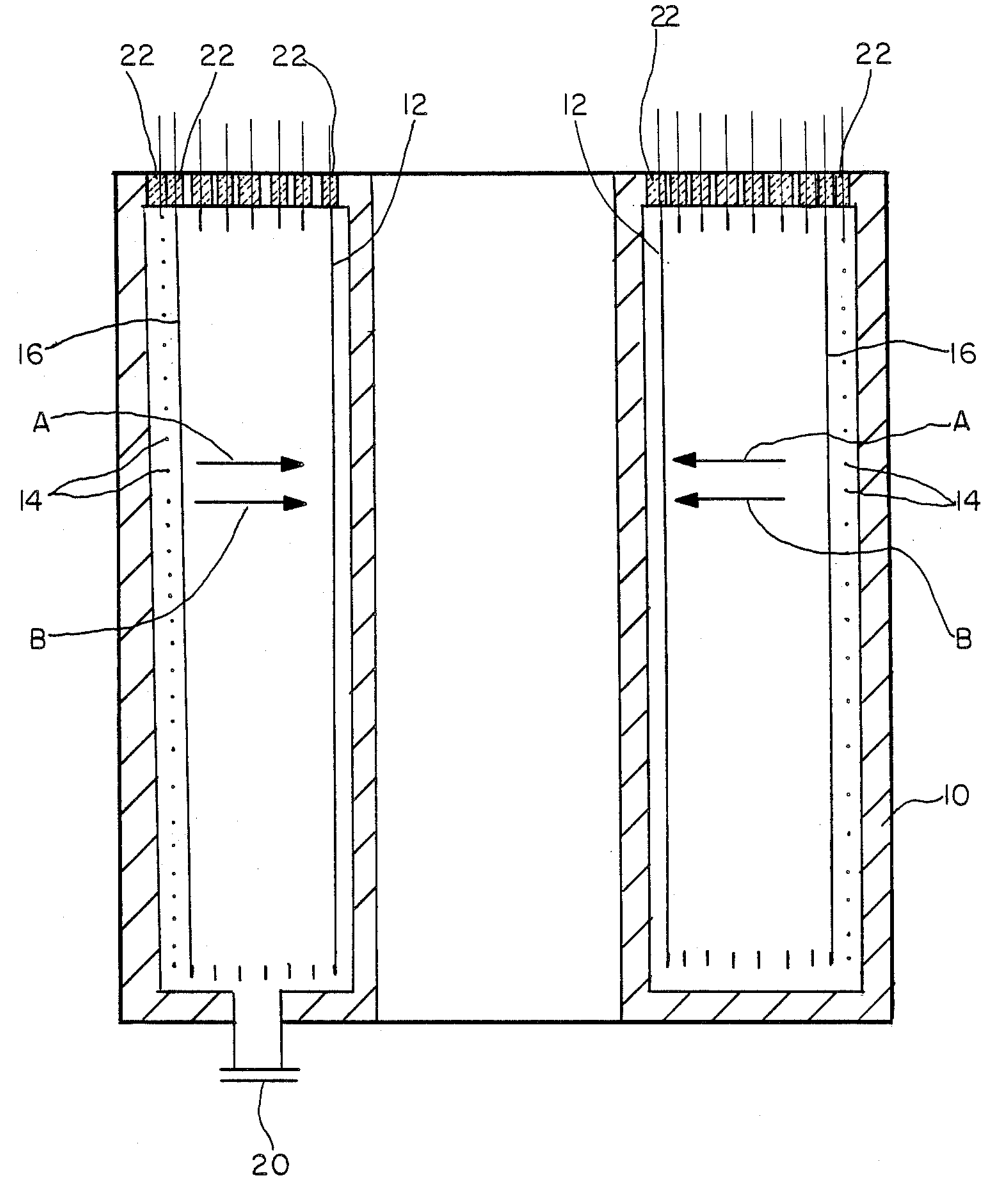

FIG. 2 is a cross-sectional view of a high pressure xenon ionization detector having an annular space.

The chemical element xenon, Xe, atomic number 54 is the fifth member of the family of noble gases, group VIII in the periodic table of elements.

Xenon, however, exists in various isotopes, namely, $Xe^{124}$, $Xe^{126}$, $Xe^{128}$, $Xe^{129}$, $Xe^{130}$, $Xe^{131}$, $Xe^{132}$, $Xe^{134}$ and $Xe^{136}$. All isotopes of xenon will behave the same way in the present invention. In one embodiment of the invention naturally occurring xenon removed from the atmosphere, having the following composition, is utilized:

| | |
|---|---|
| $Xe^{124}$:0.096% | $Xe^{130}$:4 1% |
| $Xe^{126}$:0.090% | $Xe^{131}$:21.2% |
| $Xe^{128}$:1.92% | $Xe^{132}$:26.9% |
| $Xe^{129}$:26.4% | $Xe^{134}$:10.4% |
| $Xe^{136}$:8.9% | |

The high pressure xenon used in the present invention may be liquid, gas or a mixture thereof. Xenon at or near its critical point has to have a sufficiently high density required for a high efficiency of detection of nuclear radiation, e.g., gamma-rays. Accordingly, xenon at 0° to 30° C., preferably 16° to 22° C. and 50 to 70 atmospheres, preferably 55 to 65 atmospheres can be used for the present invention.

The present invention can be used to detect and measure ionizing radiation from, for example, alpha-, beta- or gamma-rays, x-rays, neutrinos, mesons, protons and heavy ions, just to mention a few. The present invention can measure any ionizing radiation. The invention measures ionization and it does not matter what type of particle ionizes the xenon.

The xenon used in the present invention must be substantially free of electronegative gases or liquids, such as water, oxygen, carbon monoxide, fluorine, chlorine and unsaturated halogenated hydrocarbons, e.g., trichloroethylene. The content of such electronegative gases should be no more than parts per billion.

Xenon, however, can be used in the present invention with gaseous dopants such as, for example, methane, hydrogen, nitrogen, carbon dioxide, carbon tetrafluoride, "FREON" (dichlorofluoromethane; dichlorodifluoromethane), ethane, isobutane and mixtures thereof. Based on the weight of xenon, the amount of dopant can vary from 0.001 to 10 weight % and preferably from 1 to 5 weight %. The dopant serves to increase the drift speed of the electrons generated by ionization along the electric field lines.

With reference to the Figures, a high pressure cylindrical vessel 10 made from a suitable metal houses a cathode 12, an anode 14, a grid 16 and field shaping rings inlet allows xenon to enter through vessel 10. Isolators 22 serve to isolate the cathode 12, anode 14, grid 16 and field shaping rings 18. The cathode 12, anode 14, grid 16 and field shaping rings 18 are held at fixed high voltage potentials in order to establish a static electric field from the anode 14 to the cathode 12, along which path travel the electrons due to ionization of xenon. The field shaping rings 18 serve to make the electric field uniform over the entire volume of the vessel between the grid 16 and cathode 12. Typical electric fields which would be utilized would range from 500 to 5000 volts/centimeter.

The cathode 12, anode 14 and grid 16 are comprised of a plurality of metal wires having the following representative dimensions:

| | diameter | spaced (wire to wire) |
|---|---|---|
| cathode | 0.01 inches (.254 mm) | 0.03 inches (.762 mm) |
| anode | 0.01 inches (.254 mm) | 0.05 inches (1.27 mm) |
| grid | 0.005 inches (1.27 mm) | 0.05 inches (1.27 mm). |

The field shaping rings 18 are metal annular rings.

Quartz, glass or ceramic spacers (not shown) are utilized to hold and electrically isolate (separate) the wires and rings.

The present invention serves to measure the amount and position of ionization deposited, or produced, inside the volume between the grid 16 and cathode 12. The electrons formed by ionization travel toward the anode 14 along the electric field lines A and B until they reach the anode 14. A charge sensitive amplifier (not depicted) connected to the anode 14 measures the amount of charge collected at each instant on each anode 14 wire. This measurement of charge, thus ionization, is very accurate when high pressure xenon at or near its critical point is used as the detector medium.

The position of the ionization is measured by knowing which anode 14 wire the charge was collected on, and which grid 16 wire, that run perpendicular to the anode 14 wires, the charge passed by as it travels to the anode 14. These two wires define the x and y positions of the ionization. The z position, along the electric field lines A and B (these lines are in reality imaginary lines of the electric field force), can be measured in each of two ways. First, after the electrons have moved to the anode 14 the positive xenon ions remain at the position of ionization for a much longer time, e.g., several milliseconds. The position of these ions can be measured by the relative amount of induced image charge on the grid 16 and cathode 12 wires. Secondly, if one measures using a photomultiplier tube' the flash of scintillation light which occurs at the time of the ionization, and measures the time of arrival of the electrons at the anode 14, then with knowledge of the speed of travel of the electrons, drift speed, one can compute the z position of the ionization event very accurately.

In comparing the invention with the prior use of NaI and germanium, factors such as efficiency, energy resolution, position resolution and allowable rate of detection of ionization events, e.g., gamma-rays, should be evaluated.

All of NaI, germanium and xenon can be used to measure gamma-ray radiation. For the same size detector, NaI and xenon have much higher, i.e., 10 times greater, probability of detection, efficiency. However, xenon is much cheaper than either NaI or germanium and thus, one can build a bigger detector with even greater ability to detect gamma-rays than NaI, or germanium, for a similar cost. One could build a detector with 100% efficiency according to the present invention.

Energy resolution is another important property. Energy resolution is the accuracy with which one measures the energy deposited in the detector by the interaction of ionizing radiation; germanium is the best (1,600 electron volts accuracy) for measurement of a 1,000,000 electron volt gamma-ray; NaI is poor (about 100,000 electron volts accuracy for 1,000,000 electron volt gamma-ray); xenon at or near its critical point will be very good (better than 5,000 to 1,000 electron volts for a 1,000,000 electron volt gamma-ray). Compared to cryogenic liquid xenon detectors operating near the triple point of xenon, the energy resolution using the invention will be significantly better.

Position resolution is also important in many applications. Xenon at or near its critical point according to the present invention will have a position resolution of less than 1 mm in all directions; NaI is about 5 mm; germanium is many cm.

One use of the present invention would be in medical single photon computed tomography wherein a patient is injected with a gamma-ray emitting isotope and a xenon detector as described above, but with the xenon contained in an annular space and wherein the subject of radiation detecting is situated such as to be surrounded by the annular space, detects the emitted radiation pattern. NaI detectors are being used at present for this application. A xenon detector according to the present invention can have a larger geometric acceptance, better energy resolution and better position resolution.

The invention is now described with reference to the following non-limiting examples.

EXAMPLES

EXAMPLE 1

Prototype

A high pressure xenon ionization detector operated at about 20° C. and 60 atmospheres (60.79 bar) was constructed. The vessel which contained the xenon and housed the detector was made from an electro-polished 304 stainless steel cylinder, six inches (152 mm) long, four inches (102 mm) in diameter with one quarter inch thick walls. The ends were sealed with three-quarter inch thick stainless steel flanges with pure indium o-rings. Cathode, anode and grid wires were attached with indium solder to oxygen free high conductivity (OFHC) copper rings three inches (76 mm) in diameter, 1/16 inch (1/16 mm) thick, held in place and electrically isolated by 3 mm thick quartz rods. The grid was situated parallel to and in-between the anode and cathode. Ceramic high voltage feedthroughs were welded into the sides and bottom of the vessel to supply the high voltage to the cathode and grid. A feedthrough was installed in the top flange of the vessel to bring the anode wire signals to the charge sensitive amplifier placed outside the vessel. The anode was comprised of sixty (60), 0.010 inch (0.25 mm) diameter stainless steel wires separated by 0.050 inch (1.27 mm). The cathode was a similar set of one hundred (100) wires, 0.010 inch (0.25 mm) diameter stainless steel wires spaced 0.030 (0.76 mm) inches apart. The grid was composed of sixty (60) stainless steel wires 0.0050 (0.127 mm) inches in diameter with a 0.050 (1.27 mm) inch spacing between each wire. The distance between the anode wires and the grid wires was 1 cm and the distance between the grid wires and cathode wires was 2 cm. The cathode was held at −5,000 volts, the grid at −2,500 volts and the anode was held near ground potential by the charge sensitive amplifier. A 100 nano Curie source Bi-207 (bismuth-207) was plated at the midpoint of the central cathode wire. The electrons produced during ionization of xenon caused by this source was measured at the anode by the charge sensitive amplifier. The energy of these electrons was 975,000 electron volts. This energy was measured with a resolution of better than 5,000 electron volts.

EXAMPLE 2

High Pressure Xenon Detector for Medical Imaging

A high pressure xenon ionization detector is constructed to operate near the critical point of xenon, i.e., near room temperature and near 60 atmospheres (60.79 bar) pressure. The vessel which contains the xenon and houses the detector and is made of two metal cylinders, of the same length, but differing in their diameters and thicknesses. The outer stainless steel cylinder is 20 inches (508 mm) in diameter, 20 inches (508 mm) long with a wall thickness of one half inch. The inner cylinder, is made from titanium alloy, and is 10 inches (254 mm) in diameter 20 inches (508 mm) long and 0.07 inches (1.78 mm) thick. The two cylinders are welded at each end, to annular stainless steel flanges, one inch (25 mm) thick with pure indium O-ring seals. In-between the cylinders the vessel is filled with xenon at high pressure. Anode, cathode and grid wires are spaced within the volume of xenon in order to measure the ionization of the xenon at the anode wires and to determine the position of the ionization. All of the wires are held in place with soft indium by ceramic rings concentric with the vessel. The anode wires are 0.02 inch (0.51 mm) diameter stainless steel wires spaced 0.05 inches (1.27 mm) apart on a circle of a diameter of 11 inches (279 mm) concentric with the cylinder vessel. The grid wires are 0.005 inches (0.127 mm) in diameter with a spacing of 0.05 inches (1.27 mm) apart on a circle of a diameter of 12 inches (305 mm) concentric with the vessel. The cathode wires are 0.010 inches (0.254 mm) in diameter spaced 0.050 inches (1.27 mm) apart on a circle of a diameter of 19 inches concentric with the vessel. The cathode wires are held at −15,000 volts. The grid wires are held at −3,000 volts. The anode wires are held near ground potential by charge sensitive amplifiers connected to each wire independently, by feedthroughs in the annular flanges. Charge sensitive amplifiers are connected to each cathode and anode wire at the outside of their high voltage feedthroughs in the annular flanges. Ionization occurring between the cathode and grid wires travel along the electric field lines to the anode wires where the amount of ionization is measured. The position of the ionization is measured by knowing the anode wire on which it is collected, along with the position along the anode wire by measuring the relative charge collected at each end of the anode wire. The position along the electric field line between the cathode and grid wires is measured by the relative charged induced by the positive ions remaining after the electrons have been collected at the anode wire. This device is placed surrounding a part of a patient in which a radioactive substance (Tc-99m) has been placed. This device can determine the amounts and location of the radioactive substance with less than 1 mm position resolution and less than 5,000 electron volt energy resolution.

It will be appreciated that the instant specification and claims are set forth by way of illustration and not limitation and that various modifications and changes may be made without departing from the spirit and scope of the present invention.

What is claimed is:

1. A method for detecting ionization comprising allowing particles that cause ionization to contact high pressure xenon maintained at or near its critical point and measuring the amount of ionization of the xenon.

2. A method according to claim 1, wherein said xenon is at a pressure of 50 to 70 atmospheres and at a temperature of 0° to 30° C.

3. A method according to claim 1, wherein said xenon is at a pressure of 55 to 65 atmospheres and at a temperature of 16° C. to 22° C.

4. A method according to claim 1, wherein said xenon is substantially free of an electronegative gas.

5. A method according to claim 1, wherein the the xenon is substantially free of $O_2$, $H_2O$, CO, $F_2$, unsaturated halogenated hydrocarbons and $Cl_2$.

6. A method according to claim 1, wherein said xenon contains a gaseous dopant selected from the group consisting of hydrogen, methane, nitrogen, carbon dioxide, carbon tetrafluoride, dichlorofluoromethane, dichlorodifluoromethane, ethane, isobutane and mixtures thereof.

7. A method according to claim 6, wherein said dopant is in an amount of 0.001 to 10 weight %, based on the weight of the xenon.

8. In an apparatus for detecting ionization, the apparatus comprising a vessel containing a high pressure ionizable medium, said vessel having an inlet to allow the high pressure ionizable medium to enter said vessel, a means to permit particles that cause ionization of the high pressure ionizable medium to enter the vessel, an anode, a cathode, a grid and a plurality of annular field shaping rings, said field shaping rings being electrically isolated from one another in order to form an electric field between the cathode and the anode, said electric field originating at the anode and terminating at the cathode, said grid being disposed between the cathode and the anode, the field shaping rings being disposed between the cathode and the grid, the improvement comprising said high pressure ionizable medium being xenon and said vessel being maintained at a pressure of 50 to 70 atmospheres and a temperature of 0° to 30° C.

9. An apparatus for detecting ionization according to claim 8, wherein said vessel is maintained at a pressure of 55 to 65 atmospheres and at a temperature of 16° to 22° C.

10. An apparatus according to claim 8, which further comprises an annular space within the vessel for containing the high pressure ionizable medium.

* * * * *